(12) United States Patent
Liu et al.

(10) Patent No.: US 9,346,680 B2
(45) Date of Patent: *May 24, 2016

(54) MESOPOROUS METAL OXIDE GRAPHENE NANOCOMPOSITE MATERIALS

(75) Inventors: Jun Liu, Richland, WA (US); Ilhan A. Aksay, Princeton, NJ (US); Rong Kou, Richland, WA (US); Donghai Wang, State College, PA (US)

(73) Assignee: Battelle Memorial Institute, Richland, WA (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/553,527

(22) Filed: Sep. 3, 2009

(65) Prior Publication Data
US 2011/0051316 A1    Mar. 3, 2011

Related U.S. Application Data

(60) Provisional application No. 61/095,421, filed on Sep. 9, 2008, provisional application No. 61/099,388, filed on Sep. 23, 2008.

(51) Int. Cl.
*H01G 9/00* (2006.01)
*C01B 31/04* (2006.01)
(Continued)

(52) U.S. Cl.
CPC .............. *C01B 31/0484* (2013.01); *B82Y 30/00* (2013.01); *B82Y 40/00* (2013.01); *H01G 11/36* (2013.01); *H01G 11/46* (2013.01); *H01M 4/92* (2013.01);
(Continued)

(58) Field of Classification Search
CPC ........ Y02E 60/13; Y02E 60/12; H01G 9/058; H01G 9/155; H01G 11/36; H01G 11/00; Y02T 10/7022; H01M 4/8605; H01M 4/00; H01M 4/02; B82Y 30/00; B82Y 40/00; B01J 35/1061
USPC .................. 361/502, 503, 504, 508, 512, 528
See application file for complete search history.

(56) References Cited

U.S. PATENT DOCUMENTS 5,958,367 A * 9/1999 Ying et al. ..................... 423/701
5,972,088 A   10/1999 Krishnan et al.
(Continued)

FOREIGN PATENT DOCUMENTS

CN   1483212   3/2004
CN   1588679   3/2005
(Continued)

OTHER PUBLICATIONS

Aksay et al., "Biomimetic Pathways for Assembling Inorganic Thin Films," *Science* 273:892-898 (Aug. 1996).
(Continued)

*Primary Examiner* — Robert J Hoffberg
*Assistant Examiner* — Hung Dang
(74) *Attorney, Agent, or Firm* — Klarquist Sparkman, LLP

(57) ABSTRACT

A nanocomposite material formed of graphene and a mesoporous metal oxide having a demonstrated specific capacity of more than 200 F/g with particular utility when employed in supercapacitor applications. A method for making these nanocomposite materials by first forming a mixture of graphene, a surfactant, and a metal oxide precursor, precipitating the metal oxide precursor with the surfactant from the mixture to form a mesoporous metal oxide. The mesoporous metal oxide is then deposited onto a surface of the graphene.

18 Claims, 5 Drawing Sheets

(51) Int. Cl.
    *B82Y 30/00* (2011.01)
    *B82Y 40/00* (2011.01)
    *H01G 11/36* (2013.01)
    *H01G 11/46* (2013.01)
    *H01M 4/92* (2006.01)

(52) U.S. Cl.
    CPC .............. *H01M 4/926* (2013.01); *Y02E 60/13* (2013.01); *Y02E 60/50* (2013.01); *Y10T 428/24999* (2015.04); *Y10T 428/249978* (2015.04)

(56) References Cited

U.S. PATENT DOCUMENTS

| | | | |
|---|---|---|---|
| 6,264,741 | B1 | 7/2001 | Brinker et al. |
| 6,492,014 | B1 | 12/2002 | Rolison et al. |
| 7,001,669 | B2 | 2/2006 | Lu et al. |
| 7,094,499 | B1 | 8/2006 | Hung |
| 7,176,245 | B2 | 2/2007 | Stucky et al. |
| 7,309,830 | B2 | 12/2007 | Zhang et al. |
| 7,623,340 | B1* | 11/2009 | Song et al. ............ 361/502 |
| 7,875,219 | B2* | 1/2011 | Zhamu et al. ............. 264/29.1 |
| 8,257,867 | B2* | 9/2012 | Liu ................. B82Y 30/00 29/592 |
| 8,450,014 | B2 | 5/2013 | Liu et al. |
| 8,557,441 | B2 | 10/2013 | Liu et al. |
| 8,557,442 | B2 | 10/2013 | Liu et al. |
| 9,040,200 | B2 | 5/2015 | Liu et al. |
| 2002/0022122 | A1 | 2/2002 | Hirata et al. |
| 2002/0054995 | A1 | 5/2002 | Mazurkiewicz |
| 2002/0192137 | A1 | 12/2002 | Chaloner-Gill et al. |
| 2003/0086859 | A1 | 5/2003 | Kawakami et al. |
| 2004/0120880 | A1 | 6/2004 | Zhang et al. |
| 2004/0131934 | A1* | 7/2004 | Sugnaux et al. .......... 429/209 |
| 2004/0137225 | A1 | 7/2004 | Balkus, Jr. et al. |
| 2004/0150140 | A1 | 8/2004 | Zhan et al. |
| 2006/0154071 | A1 | 7/2006 | Homma et al. |
| 2007/0092432 | A1 | 4/2007 | Prud'homme et al. |
| 2007/0158618 | A1 | 7/2007 | Song et al. |
| 2007/0212538 | A1 | 9/2007 | Niu |
| 2007/0281854 | A1* | 12/2007 | Harbour et al. ........... 502/156 |
| 2008/0063585 | A1 | 3/2008 | Smalley et al. |
| 2008/0258359 | A1 | 10/2008 | Zhamu et al. |
| 2008/0279756 | A1 | 11/2008 | Zhamu et al. |
| 2008/0302561 | A1 | 12/2008 | Prud'homme et al. |
| 2008/0312368 | A1 | 12/2008 | Prud'homme et al. |
| 2009/0117467 | A1 | 5/2009 | Zhamu et al. |
| 2009/0246625 | A1 | 10/2009 | Lu |
| 2009/0290897 | A1 | 11/2009 | Doshoda et al. |
| 2009/0291270 | A1 | 11/2009 | Zettl et al. |
| 2009/0297947 | A1 | 12/2009 | Deng et al. |
| 2009/0303660 | A1 | 12/2009 | Nair et al. |
| 2009/0305135 | A1 | 12/2009 | Shi et al. |
| 2010/0081057 | A1 | 4/2010 | Liu et al. |
| 2010/0143798 | A1 | 6/2010 | Zhamu et al. |
| 2010/0159366 | A1 | 6/2010 | Shao-Horn et al. |
| 2010/0176337 | A1 | 7/2010 | Zhamu et al. |
| 2011/0033746 | A1 | 2/2011 | Liu et al. |
| 2011/0045347 | A1 | 2/2011 | Liu et al. |
| 2011/0052981 | A1 | 3/2011 | Lopez et al. |
| 2011/0111299 | A1 | 5/2011 | Liu et al. |
| 2012/0088158 | A1 | 4/2012 | Liu et al. |
| 2012/0295027 | A1 | 11/2012 | Liu et al. |
| 2012/0295096 | A1 | 11/2012 | Liu et al. |
| 2012/0305165 | A1 | 12/2012 | Liu et al. |
| 2014/0023925 | A1 | 1/2014 | Liu et al. |
| 2014/0030181 | A1 | 1/2014 | Liu et al. |

FOREIGN PATENT DOCUMENTS

| | | |
|---|---|---|
| CN | 1793451 | 6/2006 |
| CN | 101048055 | 10/2007 |
| CN | 101139090 | 3/2008 |
| CN | 101478043 | 7/2009 |
| CN | 101517786 | 8/2009 |
| CN | 101777429 | 7/2010 |
| JP | 10233211 | 9/1998 |
| WO | WO2007/015710 | 2/2007 |
| WO | WO2007/061945 | 5/2007 |
| WO | WO2008/013380 | 1/2008 |
| WO | WO2008/106991 | 9/2008 |
| WO | WO2008/143692 | 11/2008 |
| WO | WO2009/023051 | 2/2009 |
| WO | WO2009/085015 | 7/2009 |
| WO | WO2010/014215 | 2/2010 |
| WO | WO2010/030361 | 3/2010 |
| WO | WO2011/019764 | 2/2011 |
| WO | WO2011/019765 | 2/2011 |

OTHER PUBLICATIONS

Aricò et al., "Nanostructured materials for advanced energy conversion and storage devices," *Nature Materials* 4:366-377 (May 2005).
Armstrong et al., "$TiO_2$-B Nanowires," *Angewandte Chemie-International Edition* 43:2286-2288 (Apr. 2004).
Armstrong et al., "$TiO_2(B)$ Nanowires as an Improved Anode Material for Lithium-Ion Batteries Containing $LiFePO_4$ or $LiNi_{0.5}Mn_{1.5}O_4$ Cathodes and a Polymer Electrolyte," *Advanced Materials* 18:2597-2600 (Oct. 2006).
Asefa et al., "Periodic mesoporous organosilicas with organic groups inside the channel walls," *Nature* 402:867-871 (Dec. 1999).
Atkin et al., "Self-Assembly of a Nonionic Surfactant at the Graphite/Ionic Liquid Interface," *Journal of the American Chemical Society* 127:11940-11941 (Aug. 2005).
Attard et al., "Mesoporous Platinum Films from Lyotropic Liquid Crystalline Phases," *Science* 278:838-840 (Oct. 1997).
Bagshaw et al., "Templating of Mesoporous Molecular Sieves by Nonionic Polyethylene Oxide Surfactants," *Science* 269:1242-1244 (Sep. 1995).
Baudrin et al., "Structural evolution during the reaction of Li with nano-sized rutile type $TiO_2$ at room temperature," *Electrochemistry Communications* 9:337-342 (Feb. 2007).
Berger et al., "Electronic Confinement and Coherence in Patterned Epitaxial Graphene," *Science* 312:1191-1196 (May 2006).
Bonard et al., "Purification and Size-Selection of Carbon Nanotubes," *Advanced Materials* 9(10):827-831 (month unknown 1997).
Braun et al., "Semiconducting superlattices template by molecular assemblies," *Nature* 380:325-328 (Mar. 1996).
Chen et al., "Mechanically Strong, Electrically Conductive, and Biocompatible Graphene Paper," *Advanced Materials* 20:3557-3561 (Jul. 2008).
Chen et al., "Reducing Carbon in $LiFePO_4/C$ Composite Electrodes to Maximize Specific Energy, Volumetric Energy, and Tap Density," *Journal of the Electrochemical Society* 149(9):A1184-A1189 (Sep. 2002).
Decher, "Fuzzy Nanoassemblies: Toward Layered Polymeric Multicomposites," *Science* 277(9):1232-1237 (Aug. 1997).
Dikin et al., "Preparation and characterization of graphene oxide paper," *Nature* 448:457-460 (Jul. 2007).
Dominko et al., "Impact of the Carbon Coating Thickness on the Electrochemical Performance of $LiFePO_4/C$ Composites," *Journal of the Electrochemical Society* 152(3):A607-A610 (Jan. 2005).
Erjavec et al., "$RuO_2$-wired high-rate nanoparticulate $TiO_2$ (anatase): Suppression of particle growth using silica," *Electrochemistry Communications* 10:926-929 (Jun. 2008).
Gòmez-Navarro et al., "Electronic Transport Properties of Individual Chemically Reduced Graphene Oxide Sheets," *American Chemical Society* 7(11):3499-3503 (Oct. 2007).
Goward et al., "Poly(pyrrole) and poly(thiophene)/vanadium oxide interleaved nanocomposites: positive electrodes for lithium batteries," *Electrochimica Acta* 43(10-11):1307-1303 (Apr. 1998).
Guo et al., "Superior Electrode Performance of Nanostructured Mesoporous $TiO_2$ (Anatase) through Efficient Hierarchical Mixed Conducting Networks," *Advanced Materials* 19:2087-2091 (Jul. 2007).
Herle et al., "Nano-network electronic conduction in iron and nickel olivine phosphates," *Nature Materials* 3:147-152 (Feb. 2004).

(56) References Cited

OTHER PUBLICATIONS

Hu et al., "High Lithium Electroactivity of Nanometer-Sized Rutile $TiO_2$," *Advanced Materials* 18:1421-1426 (Apr. 2006).
Hu et al., "Improved Electrode Performance of Porous $LiFePO_4$ Using $RuO_2$ as an Oxidic Nanoscale Interconnect," *Advanced Materials* 19:1963-1966 (Jul. 2007).
Huang et al., "Self-organizing high-density single-walled carbon nanotube arrays from surfactant suspensions," *Nanotechnology* 15:1450-1454 (Nov. 2004).
Huo et al., "Organization of Organic Molecules with Inorganic Molecular Species into Nanocomposite Biphase Arrays," *Chemistry Materials* 6:1176-1191 (Aug. 1994).
International Preliminary Report on Patentability and Written Opinion for PCT/US2009/005085 (mailed Mar. 24, 2011).
International Search Report and Written Opinion for PCT/US2009/004369 (mailed Jan. 29, 2010).
International Search Report for PCT/US2009/005085 (mailed Feb. 4, 2010).
International Search Report for PCT/US2010/045088, mailed Oct. 6, 2010.
International Search Report for PCT/US2010/045089, mailed Oct. 27, 2010.
Jiang et al., "Nanocrystalline Rutile $TiO_2$ Electrode for High-Capacity and High-Rate Lithium Storage," *Electrochemical and Solid-State Letters* 10(5):A127-A129 (Mar. 2007).
Kavan et al., "Nanocrystalline $TiO_2$ (Anatase) Electrodes: Surface Morphology, Adsorption, and Electrochemical Properties," *Journal of the Electrochemical Society* 143(2):394-400 (Feb. 1996).
Kresge et al., "Ordered mesoporous molecular sieves synthesized by a liquid-crystal template mechanism," *Nature* 359:710-712 (Oct. 1992).
Leroux et al., "Electrochemical Lithium Intercalation into a Polyaniline/$V_2O_5$ Nanocomposite," *J. Electrochemical Society* 143(9):L181-L183 (Sep. 1996).
Li et al., "Processable aqueous dispersions of grapheme nanosheets," *Nature Nanotechnology* 3:101-105 (Jan. 2008).
Liu et al., "Oriented Nanostructures for Energy Conversion and Storage," *ChemSusChem* 1:676-697 (Aug. 2008).
Lou et al., "Template-Free Synthesis of $SnO_2$ Hollow Nanostructures with High Lithium Storage Capacity," *Advanced Materials* 18:2325-2329 (Aug. 2006).
Maier et al., "Nanoionics: ion transport and electrochemical storage in confined systems," *Nature Materials* 4:805-815 (Nov. 2005).
Mao et al., "Structural, electronic and magnetic properties of manganese doping in the upper layer of bilayer graphene," *Nanotechnology* 19(20):205708-205715 (May 2008).
McAllister et al., "Single Sheet Functionalized Graphene by Oxidation and Thermal Expansion of Graphite," *Chemical Materials* 19:4396-4404 (May 2007).
Moriguchi et al., "A Mesoporous Nanocomposite of $TiO_2$ and Carbon Nanotubes as a High-Rate Li-Intercalation Electrode Material," *Advanced Materials* 18:69-73 (Jan. 2006).
Moskon et al., "Citrate-Derived Carbon Nanocoatings for Poorly Conducting Cathode," *Journal of the Electrochemical Society* 153(10):A1805-A1811 (Jul. 2006).
Nethravathi, et al., "Graphite Oxide-Intercalated Anionic Clay and Its Decomposition to Graphene-Inorganic Material Nanocomposites," *Langmuir* 24:8240-8244 (Aug. 2008).
Nishihara et al., "Carbon-coated mesoporous silica with hydrophobicity and electrical conductivity," *Carbon* 46(1):pp. 48-53 (Jan. 2008).
Niyogi et al., "Solution Properties of Graphite and Graphene," *Journal of the American Chemical Society* 128:7720-7721 (Jan. 2006).
Novoselov et al., "Electric Field Effect in Atomically Thin Carbon Films," *Science* 306:666-669 (Oct. 2004).
Paek et al., "Enhanced Cyclic Performance and Lithium Storage Capacity of $SnO_2$/Graphene Nanoporous Electrodes with Three-Dimensionally Delaminated Flexible Structure," *Nano Letters* 9(1):72-75 (Dec. 2008).
Peigney et al., "Specific surface area of carbon nanotubes and bundles of carbon nanotubes," *Carbon* 39:507-514 (Apr. 2001).
Prosini et al., "Improved electrochemical performance of a $LiFePO_4$-based composite cathode," *Electrochimica Acta* 46:3517-3523 (Aug. 2001).
Ramanathan et al., "Functionalized graphene sheets for polymer nanocomposites," *Nature Nanotechnology* 3:327-331 (May 2008).
Read et al., "$SnO_2$-carbon composites for lithium-ion battery anodes," *Journal of Power Sources* 96:277-281 (Jun. 2001).
Reddy et al., "Room temperature synthesis and Li insertion into nanocrystalline rutile $TiO_2$," *Electrochemistry Communications* 8:1299-1303 (Aug. 2006).
Restriction Requirement from the U.S. Patent and Trademark Office for U.S. Appl. No. 12/462,857, mailed Aug. 22, 2011.
Richard et al., "Supramolecular Self-Assembly of Lipid Derivatives on Carbon Nanotubes," *Science* 300:775-778 (May 2003).
Sakamoto et al., "Hierarchical battery electrodes based on inverted opal structures," *Journal of Materials Communication* 12:2859-2861 (Aug. 2002).
Schniepp et al., "Functionalized Single Graphene Sheets Derived from Splitting Graphite Oxide," *The Journal of Physical Chemistry Letters* 110:8535-8539 (Apr. 2006).
Schniepp et al., "Self-Healing of Surfactant Surface Micelles on Millisecond Time Scales," *Journal of the American Chemical Society* 128:12378-12379 (Aug. 2006).
Si, et al., "Synthesis of Water Soluble Graphene," *Nano Letters* 8(6):1679-1682 (May 2008).
Srinivas, et al., "Molecular Dynamics Simulations of Surfactant Self-Organization at a Solid—Liquid Interface," *Journal of the American Chemical Society* 128(3):848-853 (Jan. 2006).
Stankovich et al., "Graphene-based composite materials," *Nature* 442:282-286 (Jul. 2006).
Stankovich et al., "Stable aqueous dispersions of graphitic nanoplatelets via the reduction of exfoliated graphite oxide in the presence of poly(sodium 4-styrenesulfonate)," *Journal of Materials Chemistry* 16:155-158 (document marked Nov. 2005).
Stoller et al., "Graphene-Based Ultra capacitors," *Nano Letters* 8(10):3498-3502 (Sep. 2008).
Suzuki et al., "H-T phase diagram and the nature of vortex-glass phase in a quasi-two-dimensional superconductor: Sn-metal layer sandwiched between graphene sheets," *Physica C: Superconductivity* 402(3):243-256 (Nov. 2003).
Tanaka et al., "Characteristics of graphene-layer encapsulated nanoparticles fabricated using laser ablation method," *Diamond and Related Materials* 17(4-5):664-668 (Nov. 2007).
Tarascon et al., "Issues and challenges facing rechargeable lithium batteries," *Nature* 414:359-367 (Nov. 2001).
Wang, et al., "Surface-Mediated Growth of Transparent, Oriented, and Well-Defined Nanocrystalline Anatase Titania Films," *Journal of the American Chemical Society* 128:13670-13671 (Oct. 2008).
Wang et al., "Low-Temperature Synthesis of Tunable Mesoporous Crystalline Transition Metal Oxides and Applications as Au Catalyst Supports," *Chemistry of Materials* 20:13499-13509 (Aug. 2008).
Wang, et al., "Synthesis and Li-Ion Insertion Properties of Highly Crystalline Mesoporous Rutile $TiO_2$," *American Chemical Society* 20:3435-3442 (May 2008).
Wang, et al., "Atomic Layer Deposition of Metal Oxides on Pristine and Functionalized Graphene," *Journal of the American Chemical Society* 130:8152-8153 (Jun. 2008).
Wang, et al., "Cooperative Self-Assembly of Tertiary Systems: Novel Graphene-Metal Oxide Nanocomposites," *Pacific Northwest National Laboratory* and *Princeton University* 21 pages (date unknown).
Watcharotone et al., "Graphene-Silica Composite Thin Films as Transparent Conductors," *Nano Letters* 7(7)1888-1892 (Jun. 2007).
Whitesides, et al., "Molecular Self-Assembly and Nanochemistry: A Chemical Strategy for the Synthesis of Nanostructures," *Science* 254:1312-1319 (Nov. 1991).
Williams, et al., "$TiO_2$-Graphene Nanocomposites. UV-Assisted Photocatalytic Reduction of Graphene Oxide," *ACS Nano* 2(7):1487-1491 (Jul. 2008).

(56) References Cited

OTHER PUBLICATIONS

Xu, et al., "Flexible Graphene Films via the Filtration of Water-Soluble Noncovalent Functionalized Graphene Sheets," *Journal of the American Chemical Society* 130:5856-5857 (Apr. 2008).
Yamabi, et al., "Crystal Phase Control for Titanium Dioxide Films by Direct Deposition in Aqueous Solutions," *Chemical Materials* 14:609-614 (Jan. 2002).
Yang, et al., "Generalized syntheses of large-pore mesoporous metal oxides with semicrystalline frameworks," *Nature* 396:152-155 (Nov. 1998).
Yoo, et al., "Large Reversible Li Storage of Graphene Nanosheet Families for Use in Rechargeable Lithium Ion Batteries," *Nano Letters* 8(8):2277-2282 (Aug. 2008).
Zhao et al., "Triblock Copolymer Syntheses of Mesoporous Silica with Periodic 50 to 300 Angstrom Pores," *Science* 279:548-552 (Jan. 1998).
Zhou et al., "Lithium Insertion into $TiO_2$ Nanotube Prepared by the Hydrothermal Process," *Journal of the Electrochemical Society* 150(9):A1246-A1249 (Jul. 2003).
Zukalováet al., "Pseudocapacitive Lithium Storage in $TiO_2(B)$," *Chemistry of Materials* 17:1248-1255 (Feb. 2005).
Bizdoaca et al., "Magnetically directed self-assembly of submicron spheres with a $Fe_3O_4$ nanoparticle shell," *Journal of Magnetism and Magnetic Materials*, 240(1-3):44-46 (Feb. 2002).
Gòmez-Navarro et al., "Electronic Transport Properties of Individual Chemically Reduced Graphene Oxide Sheets," *Nano Letters*, 7(11):3499-3503 (Oct. 2007).
Goncalves et al., "Surface modification of graphene nanosheets with gold nanoparticles: the role of oxygen moieties at graphene surface on gold nucleation and growth," *Chem. Mater*, 21(20):4796-4802 (Sep. 2009).
Lindsay, "Data analysis and anode materials for lithium ion batteries," PhD Thesis, University of Wollongong Thesis Collection, Ch. 2, Section 2.5.5, http://ro.uow.edu.au/theses/359 (2004).
Office action from U.S. Patent and Trademark Office for U.S. Appl. No. 12/460,993, mailed Jan. 19, 2012.
Office action from U.S. Patent and Trademark Office for U.S. Appl. No. 12/462,857, mailed Jan. 10, 2012.
Office action from U.S. Patent and Trademark Office for U.S. Appl. No. 12/852,794, mailed Jan. 23, 2012.
Ribeiro et al., "Assembly and Properties of Nanoparticles," *Nanostructure Science and Technology*, 33-79, see 62-63, 77 (2009).
Superior Graphite Company, "Development of Low cost Carbonaceous Materials for Anodes in Lithium-Ion Batteries for Electric and Hybrid Electric Vehicles," DE-F02-00EE50630, 50 pages (Dec. 10, 2002).
Tung et al., "Low-temperature solution processing of graphene-carbon nanotube hybrid materials for high-performance transparent conductors," *Nano Lett.*, 9(5):1949-1955 (Apr. 2009).
U.S. Appl. No. 12/980,328, filed Dec. 28, 2010.
Wang et al., "Microemulsion Syntheses of Sn and $SnO_2$-Graphite Nanocomposite Anodes for Li-Ion Batteries," *Journal of the Electrochemical Society*, 151(4):A563-A570 (Feb. 20, 2004).
Wang et al., "Self-Assembled TiO-Graphene Hybrid Nanostructures for Enhanced Li-Ion Insertion," *ACS Nano*, 3(4):907-914 (Mar. 26, 2009).
Wang, et al., "Synthesis and Li-Ion Insertion Properties of Highly Crystalline Mesoporous Rutile $TiO_2$," *Chem. Mater.*, 20:3435-3442 (May 2008).
Wang et al., "Tin Nanoparticle Loaded Graphite Anodes for Li-Ion Battery Applications," *Journal of the Electrochemical Society*, 151(11):A563-A570 (Oct. 4, 2004).
Xu et al., "Assembly of chemically modified graphene: methods and applications," *J. Mater. Chem.*, 21:3311-3323 (Mar. 2011).
Final Office action from U.S. Patent and Trademark Office for U.S. Appl. No. 12/462,857, mailed Aug. 23, 2012.
Final Office action from U.S. Patent and Trademark Office for U.S. Appl. No. 12/852,794, mailed Jul. 3, 2012.
International Preliminary Report on Patentability and Written Opinion for PCT/US2009/004369 (mailed Feb. 10, 2011).

International Preliminary Report on Patentability and Written Opinion for PCT/US2010/045088 (mailed Feb. 23, 2012).
International Preliminary Report on Patentability and Written Opinion for PCT/US2010/045089 (mailed Feb. 23, 2012).
Kang et al., "The Cycling Performance of Graphite Electrode Coated with Tin Oxide for Lithium Ion Battery," *Journal of the Korean Electrochemical Society*, 5(2):52-56 (May 2002).
Lee, "Dispersion of Sn and SnO on carbon anodes," *Journal of Power Sources*, 90(1):70-75 (Sep. 2000).
McDermott et al., "Electron Transfer Kinetics of Aquated $Fe^{+3/+2}$, $Eu^{+3/+2}$, and $V^{+3/+2}$ at Carbon Electrodes," *Journal of the Electrochemical Society*, 140(9):2593-2599 (Sep. 1993).
Mdleleni et al., "Sonochemical Synthesis of Nanostructured Molybdenum Sulfide," *Journal of the American Chemical Society*, 12:6189-6190 (Jun. 1998).
Mockensturm et al., "Van Der Waals' Elastica," *2005 ASME International Mechanical Engineering Congress and Exposition*, 277-291 (Nov. 5-11, 2005).
Murakami et al., "Formation of Positronium in Cup-stacked Carbon Nanofibers," (Abstract and Introduction Only) *Materials Science Forum*, 445-446:331-333 (Jan. 2004).
Nakahara et al., "Structural changes of a pyrolytic graphite surface oxidized by electrochemical and plasma treatment," *Journal of Materials Science*, 29(12):3193-3199 (Jun. 1994).
Notice of Allowance from U.S. Patent and Trademark Office for U.S. Appl. No. 12/460,993, mailed Jul. 11, 2012.
Office action from the Chinese Patent Office for Chinese Patent Application No. 200980135205.8, mailed Nov. 14, 2012.
Office action from the Chinese Patent Office for Chinese Patent Application No. 200980129673.4, mailed Sep. 10, 2012.
Office action from U.S. Patent and Trademark Office for U.S. Appl. No. 12/901,526, mailed Dec. 3, 2012.
Office action from U.S. Patent and Trademark Office for U.S. Appl. No. 12/980,328, mailed Feb. 27, 2013.
Office action from U.S. Patent and Trademark Office for U.S. Appl. No. 13/559,528, mailed Jan. 10, 2013.
Office action from U.S. Patent and Trademark Office for U.S. Appl. No. 13/585,741, mailed Jan. 14, 2013.
Ou et al., "Characteristics of graphene-layer encapsulated nanoparticles fabricated using laser ablation method," *Diamond and Related Materials*, 17(4-5):664-668 (Apr.-May 2008).
Restriction Requirement from the U.S. Patent and Trademark Office for U.S. Appl. No. 12/901,527, mailed Dec. 13, 2012.
Shao, "Influencing Surface Tension," *California State Science Fair 2006 Project Summary* Project No. J0531 http://www.usc.edu/CSSF/History/2006/Projects/J0531.pdf (Apr. 2006).
Slack, "Thermal Conductivity of Pure and Impure Silicon, Silicon Carbide, and Diamond," *Journal of Applied Physics*, 35(12):3460-3466 (Dec. 1964).
Suslick et al., "Sonochemical synthesis of amorphous iron," *Nature*, 353:414-416 (Oct. 1991).
USP, "Material Safety Data Sheet—Sodium Lauryl Sulfate," Catalog No. 1614363 (Oct. 28, 2010).
Wakihara et al., "Lithium Ion Batteries Fundamentals and Performance," Wiley-VCH, New York (1998).
Walker, *Just the Facts 101 Textbook Key Facts, Physics*, vol. 1, Chapter 15 Fluids, p. 13 http://books.google.com/books?id=fhRX6IFg2fcC&pg=PT278Ipg=PT278&dq=%22Surfactants+are+compounds+that+lower+the+surface+tension+of+a+liquid%22+-2012+-2011+-2010+-2009&source=bl&ots=cVS1AJ-GOS&sig=e9wgCJkhGYTe2zdqoql1y-iQG1o&hl=en&sa=X&ei=-6ErUO6NO6Wo0AGh74D4Bw&ved=OCEUQ6AEwBA#v=onepage&q=%22Surfactants%20are%20compounds%20that%20lower%20the%20surface%20tension%20of%20a%20liquid%22%20-20-2012%20-2011%20-2010%20-2009&f=false.
Yao et al., "In situ chemical synthesis of $SnO_2$-graphene nanocomposite as anode materials for lithium-ion batteries," *Electrochemistry Communications*, 11:1849-1852 (Aug. 2009).
Yu et al., "Mesoporous tin oxides as lithium intercalation anode materials," *Journal of Power Sources*, 104:97-100 (Jan. 2002).
Choi et al., "Li-ion batteries from $LiFePO_4$ cathode and anatase/graphene composite anode for stationary energy storage," *Electrochemistry Communications* 12(3):378-381 (Jan. 2010).

(56) References Cited

OTHER PUBLICATIONS

Franger et al., "Optimized Lithium Iron Phosphate for High-Rate Electrochemical Application," *Journal of the Electrochemical Society*, vol. 151, No. 7, pp. A1024-A1027 (May 2004).
International Search Report and Written Opinion for PCT/US2011/047144 (mailed Feb. 23, 2012).
International Search Report and Written Opinion for PCT/US2011/055216 (mailed Apr. 23, 2012).
International Search Report and Written Opinion for PCT/US2011/62016 (mailed Apr. 9, 2012).
Corrected Notice of Allowance from U.S. Patent and Trademark Office for U.S. Appl. No. 13/559,528, mailed Jul. 23, 2013.
Final Office action from U.S. Patent and Trademark Office for U.S. Appl. No. 13/585,741, mailed May 23, 2013.
Kim et al., "Direct synthesis of uniform mesoporous carbons from the carbonization of as-synthesized silica/triblock copolymer nanocomposites," Carbon, 42:2711-2719 (2004).
Notice of Allowance from U.S. Patent and Trademark Office for U.S. Appl. No. 12/901,526, mailed Apr. 15, 2013.
Notice of Allowance from U.S. Patent and Trademark Office for U.S. Appl. No. 13/559,528, mailed Jul. 1, 2013.
Notice of Allowance from U.S. Patent and Trademark Office for U.S. Appl. No. 12/901,527, mailed Aug. 2, 2013.
Office action from the Chinese Patent Office for Chinese Patent Application No. 200980129673.4, mailed Mar. 7, 2013.
Office action from the Chinese Patent Office for Chinese Patent Application No. 200980135205.8, mailed Oct. 9, 2013.
Office action from U.S. Patent and Trademark Office for U.S. Appl. No. 12/901,527, mailed Apr. 8, 2013.
Office action from U.S. Patent and Trademark Office for U.S. Appl. No. 13/559,538, mailed Jul. 1, 2013.
Restriction Requirement from the U.S. Patent and Trademark Office for U.S. Appl. No. 13/559,528, mailed Oct. 29, 2012.
Seeger et al., "Nanotube composites: novel SiO2 coated carbon nanotubes," *Chem Commun.* 34-35 (2002).
The Free Dictionary (Collins English Dictionary Entry) http://www.thefreedictionary.com/p/slurry (printed Apr. 15, 2015).
Wang et al., "Surfactant-Mediated Synthesis of a Novel Nanoporous Carbon—Silica Composite," *Chem. Mater.* 15:2926-2935 (2003).
Final Office action from U.S. Patent and Trademark Office for U.S. Appl. No. 13/559,538, mailed Mar. 4, 2014.
Office action from the Chinese Patent Office for Chinese Patent Application No. 201080045223X, mailed Jan. 3, 2014.
Office action from the Chinese Patent Office for Chinese Patent Application No. 201080045283.1, mailed Feb. 11, 2014.
Office action from U.S. Patent and Trademark Office for U.S. Appl. No. 12/980,328, mailed Mar. 27, 2014.
Notice of Allowance from U.S. Patent and Trademark Office for U.S. Appl. No. 12/852,794, mailed Jul. 17, 2014.
Office action from the European Patent Office for European Patent Application No. 09789026.3, mailed Jun. 2, 2014.
Office action from the European Patent Office for European Patent Application No. 09789291.3, mailed Jun. 2, 2014.
Lee et al., "Electrochemical characteristics of graphite coated with tin-oxide and copper by fluidised-bed chemical vapour deposition," *Journal of Power Sources*, 107(1):90-97 (Apr. 2002).
Office Action from the Korean Patent Office for Korean Patent Application No. 10-2011-7006335, mailed May 26, 2015.
Notice of Allowance from U.S. Patent and Trademark Office for U.S. Appl. No. 14/040,462, mailed Apr. 9, 2015.
Notice of Allowance from U.S. Patent and Trademark Office for U.S. Appl. No. 14/043,707, mailed Apr. 24, 2015.
Office action from the Canadian Intellectual Property Office for Canadian Patent Application No. 2,733,275, mailed May 7, 2015.
Guo et al., "Synthesis of hierarchically mesoporous anatase spheres and their application in lithium batteries," *Chem. Commun.* 2783-2785 (May 2006).
Office action from the Korean Patent Office for Korean Patent Application No. 10-2011-7004537, mailed Oct. 28, 2015.
Office action from the Korean Patent Office for Korean Patent Application No. 10-2011-7006335, mailed Nov. 9, 2015.
Final Office action from U.S. Patent and Trademark Office for U.S. Appl. No. 12/980,328, mailed Oct. 6, 2014.
Office action from the Chinese Patent Office for Chinese Patent Application No. 200980129673.4, mailed Sep. 3, 2014.
Office action from the Chinese Patent Office for Chinese Patent Application No. 201080045223X, mailed Aug. 12, 2014.
Office action from the Chinese Patent Office for Chinese Patent Application No. 201080045283.1, mailed Sep. 24, 2014.
Office action from the Chinese Patent Office for Chinese Patent Application No. 201180047687.9, mailed Nov. 3, 2014.
Office action from the European Patent Office for European Patent Application No. 10747347.2, mailed Dec. 12, 2014.
Office action from U.S. Patent and Trademark Office for U.S. Appl. No. 13/559,538, mailed Sep. 26, 2014.
Partoens et al., "From graphene to graphite: Electronic structure around the K point," *Phys. Rev. B.*, vol. 74, pp. 075404-1-075404-11, (Aug. 2006).

* cited by examiner

MESOPOROUS METAL OXIDE GRAPHENE NANOCOMPOSITE MATERIALS

PRIORITY CLAIM

This application claims priority from provisional patent application No. 61/095,421, filed Sep. 9, 2008 as well as provisional patent application No. 61/099,388 filed Sep. 23, 2008 the contents of both are herein incorporated by reference.

The invention was made with Government support under Contract DE-AC0676RLO 1830, awarded by the U.S. Department of Energy. The Government has certain rights in the invention.

TECHNICAL FIELD

This invention relates to improved materials used in electrochemical applications such as batteries, capacitors and supercapacitors. More specifically, the present invention relates to nanocomposite materials combining mesoporous metal oxides and graphene which exhibit electrical properties heretofore unknown in the art.

BACKGROUND OF THE INVENTION

Recent studies have focused on the development of ultracapacitors (or supercapacitors) as advanced electrical energy storage devices to increase the efficiency of energy utilization. In most commercial ultracapacitor applications, high surface area carbon has become the leading candidate material in the development of electrochemical ultracapacitors. These devices are also referred to as electrochemical double layer capacitors (EDLC) since the basic mechanism of electrical energy storage is through charge separation in the electrochemical double layer formed at the electrode/electrolyte interfacial regions. When the electrode is biased, a double layer structure is developed with the opposite charge accumulated near the electrode surface. The double layer thickness (d) is related to the Debye screening length in the modified Gouy-Chapman model. The double layer capacitance (c) is related to the surface area, the effective dielectric constant ($\in$) and the double layer thickness by an inverse linear relationship ($C=\in A/d$). A typical smooth surface will have a double layer capacitance of about 10-20 $\mu F/cm2$. In order to enhance mass storage density, high surface area electrodes are necessary. Thus, for a conducting material with a specific surface area of 1000 $m^2/g$, the capacitance can be increased to 100 F/g.

In most commercial applications, high surface area carbon-based materials have been the material of choice mainly due to their high electronic conductivity and availability at modest cost. A wide range of high surface area carbon-based materials have been investigated, including activated carbon, multi- and single walled carbon nanotubes. The capacitance typically ranges from 40 to 140 F/g for activated carbon, and 15 to 135 F/g for carbon nanotubes. Currently, the best available commercial products reach about 130 F/g.

Those active in the art have pursued several approaches toward improving the charge storage density in carbon-based supercapacitors. These approaches have typically focused on achieving a higher capacitance either by careful thermal, chemical, or electrochemical treatment of the carbon-based material to increase the accessible surface area and surface functional groups, or by extending the operating voltage range beyond the limit of an aqueous electrolyte solution.

Pursuing the first approach, significant effort has been made to maximize the surface area of carbon-based materials. Pursuing the second approach, significant effort has been made to increase the capacitance by modifying the interface. For example, surface functionalization proves to be effective in increasing the pseudocapacitance arising from oxidation/reduction of surface quindoidal functional groups generated during sample treatment. Another widely investigated method enhances the capacitance by coating the carbon-based material with redox active metal oxides such as manganese oxides or conducting polymers such as polyaniline and polypyrrole. With this method, polypyrrole coated carbon nanotubes have been shown to attain a capacitance of 170 F/g, and $MnO_2$ coated carbon nanotubes have been shown to attain a capacitance of 140 F/g, but these composite materials still do not offset the fundamental limitations of the polymer and $MnO_2$, including limited stability and operating voltage range.

Because optimization through surface area and extending the operating voltage range beyond the limit of an aqueous electrolyte solution cannot result in further major improvements, fundamentally new mechanisms need to be discovered to achieve the next significant jump in the storage density of ultracapacitors. The present invention provides one such new mechanism.

Recently, graphene, highly dispersed atom-layer of hexagonal arrayed carbon atoms, has attracted the interest of those seeking to fabricate new composite materials for molecular electronics due to its high conductivity and good mechanical properties. The combination of high electrical conductivity, good mechanical properties, high surface area, and low manufacturing cost make graphene an ideal candidate material for electrochemical applications. Assuming an active surface area of 2600 $m^2/g$ and typical capacitance of 10 $\mu F/m^2$ for carbon materials, graphene has the potential to reach 260 F/g in theoretical specific capacity. However, this high capacity has not been reached because it has proven difficult to completely disperse the graphene sheets and the access all the surface area.

Graphene is generally described as a one-atom-thick planar sheet of $sp^2$-bonded carbon atoms that are densely packed in a honeycomb crystal lattice. The carbon-carbon bond length in graphene is approximately 0.142 nm. Graphene is the basic structural element of some carbon allotropes including graphite, carbon nanotubes and fullerenes. Graphene exhibits unique properties, such as very high strength and very high conductivity.

Graphene has been produced by a variety of techniques. For example, graphene is produced by the chemical reduction of graphene oxide, as shown in Gomez-Navarro, C.; Weitz, R. T.; Bittner, A. M.; Scolari, M.; Mews, A.; Burghard, M.; Kern, K. Electronic Transport Properties of Individual Chemically Reduced Graphene Oxide Sheets. and *Nano Lett.* 2007, 7, 3499-3503. Si, Y.; Samulski, E. T. Synthesis of Water Soluble Graphene. *Nano Lett.* 2008, 8, 1679-1682.

While the resultant product shown in the forgoing methods is generally described as graphene, it is clear from the specific capacity of these materials that complete reduction is not achieved, because the resultant materials do not approach the theoretical specific capacity of neat graphene. Accordingly, at least a portion of the graphene is not reduced, and the resultant material contains at least some graphene oxide. As used herein, the term "graphene" should be understood to encompass materials such as these, that contain both graphene and small amounts of graphene oxide.

For example, functionalized graphene sheets (FGSs) prepared through the thermal expansion of graphite oxide as shown in McAllister, M. J.; LiO, J. L.; Adamson, D. H.; Schniepp, H. C.; Abdala, A. A.; Liu, J.; Herrera-Alonso, M.; Milius, D. L.; CarO, R.; Prud'homme, R. K.; Aksay, I. A. Single Sheet Functionalized Graphene by Oxidation and Thermal Expansion of Graphite. *Chem. Mater.* 2007, 19, 4396-4404 and Schniepp, H. C.; Li, J. L.; McAllister, M. J.; Sai, H.; Herrera-Alonso, M.; Adamson, D. H.; Prud'homme, R. K.; Car, R.; Saville, D. A.; Aksay, I. A. Functionalized Single Graphene Sheets Derived from Splitting Graphite Oxide. *J. Phys. Chem. B* 2006, 110, 8535-8539 have been shown to have tunable C/O ratios ranging from 10 to 500. The term "graphene" as used herein should be understood to include both pure graphene and graphene with small amounts of graphene oxide, as is the case with these materials.

Further, while graphene is generally described as a one-atom-thick planar sheet densely packed in a honeycomb crystal lattice, these one-atom-thick planar sheets are typically produced as part of an amalgamation of materials, often including materials with defects in the crystal lattice. For example, pentagonal and heptagonal cells constitute defects. If an isolated pentagonal cell is present, then the plane warps into a cone shape. Likewise, an isolated heptagon causes the sheet to become saddle-shaped. When producing graphene by known methods, these and other defects are typically present.

The IUPAC compendium of technology states: "previously, descriptions such as graphite layers, carbon layers, or carbon sheets have been used for the term graphene . . . it is not correct to use for a single layer a term which includes the term graphite, which would imply a three-dimensional structure. The term graphene should be used only when the reactions, structural relations or other properties of individual layers are discussed". Accordingly, while it should be understood that while the terms "graphene" and "graphene layer" as used in the present invention refers only to materials that contain at least some individual layers of single layer sheets, the terms "graphene" and "graphene layer" as used herein should therefore be understood to also include materials where these single layer sheets are present as a part of materials that may additionally include graphite layers, carbon layers, and carbon sheets.

Traditionally conductive graphene sheets have produced by mechanical exfoliation. By nature the graphite surface is hydrophobic. Oxidation of graphite followed by exfoliation has been shown to produce more soluble graphene oxide, but with a lower conductivity. Reduction of graphene oxides to increase the conductivity significantly reduces the solubility (<0.5 mg/mL) and makes the material vulnerable to irreversible aggregation.

Following the research from carbon nanotubes, two main methods to improve surface properties of graphene have been investigated. The first approach is through surface functionalization of reduced graphene oxides in order to make soluble and stable graphene possible for materials process. For example, functional groups (e.g., $-CH_3$, $-SO_3$ group) are covalently attached to graphene surfaces through oxygen functionality ($-O-$, $-COOH$), but this process also incorporates defects on $sp^2$ conjugation of carbon atoms, which affect the intrinsic unique properties such as high conductivity.

The second approach is non-covalent functionalization using surfactant, polymer or aromatic molecules. In general a good electrode material needs to meet some key requirements: good wetting for the electrolyte or catalyst, a good conductive pathway throughout the electrode materials, and a continuous porous network for rapid diffusion and mass transport. To date, efforts to produce materials using the second approach have not approached the theoretical properties of graphene based materials. The present invention overcomes those shortcomings.

SUMMARY OF THE INVENTION

One aspect of the present invention is thus a nanocomposite material formed of graphene and a mesoporous metal oxide. Preliminary studies of the materials of the present invention have demonstrated that the specific capacity of these nanocomposite materials can be increased to more than 200 F/g. The present invention thus provides nanocomposite materials that exhibit properties heretofore unavailable using materials known in the art. While not limited to such applications, the present invention finds particular utility when employed in supercapacitor applications. The present invention further provides a method for making these nanocomposite materials.

The method of the present invention generally proceeds by first forming a mixture of graphene, a surfactant, and a metal oxide precursor. The metal oxide precursor with the surfactant is then precipitated from the mixture to form a mesoporous metal oxide. The mesoporous metal oxide is then deposited onto a surface of the graphene.

Preferably, but not meant to be limiting, the surfactant is non-ionic surfactant. A suitable non-ionic surfactant includes, but is not limited to, a tri-block copolymer. Preferably, but not meant to be limiting, the method of making the nanocomposite materials may further include the step of heating the mixture at a temperature of between about 100 to 500 degrees C. to condense the metal oxide on the surface of the graphene.

Also preferably, but not meant to be limiting, the method of the present invention may further practice the step of heating the mixture from 100 to 500 degrees C. to remove the surfactant.

The present invention further encompasses a nanocomposite material comprising a mesoporous metal oxide bonded to at least one graphene layer. The nanocomposite material may include embodiments where the mesoporous metal oxide is substantially inert and substantially nonconductive. One example of a suitable mesoporous metal oxide is silica. Preferably, but not meant to be limiting, the graphene layers and the mesoporous metal oxides are generally uniformly distributed throughout the nanoarchitecture of the nanocomposite material of the present invention.

Preferably, but not meant to be limiting, the mesoporous metal oxide has pore sizes ranging from about 1 nm to about 30 nm. Also preferably, but not meant to be limiting, at least a portion of the mesoporous metal oxide has a thickness between 0.5 and 50 nm and more preferably a thickness between 2 and 10 nm.

While not meant to be limiting, the present invention provides particular utility when configured as an energy storage device. One suitable energy storage device that takes advantage of the present invention's unique properties is a configuration wherein a nanocomposite material having mesoporous silica bonded to at least one graphene layer and is utilized as an ultracapacitor. In this configuration, it is preferred that the capacitance of the ultracapacitor is greater than 150 F/g and more preferred that the capacitance of the ultracapacitor is greater than 200 F/g. The ultracapacitor may further be a double layer ultracapacitor.

BRIEF DESCRIPTION OF THE DRAWINGS

The following detailed description of the embodiments of the invention will be more readily understood when taken in conjunction with the following drawings.

FIG. 5 *c* are a cyclic voltammograms for a commercial catalyst (Etek), Pt-FGS and Pt-FGS-MS. FIG. 5 *d* is a graph showing a comparison of measured ESA (electrochemically active surface area) in Etek, Pt-FGS and Pt-FGS-MS.

DETAILED DESCRIPTION OF THE PREFERRED EMBODIMENTS

Figure 1:
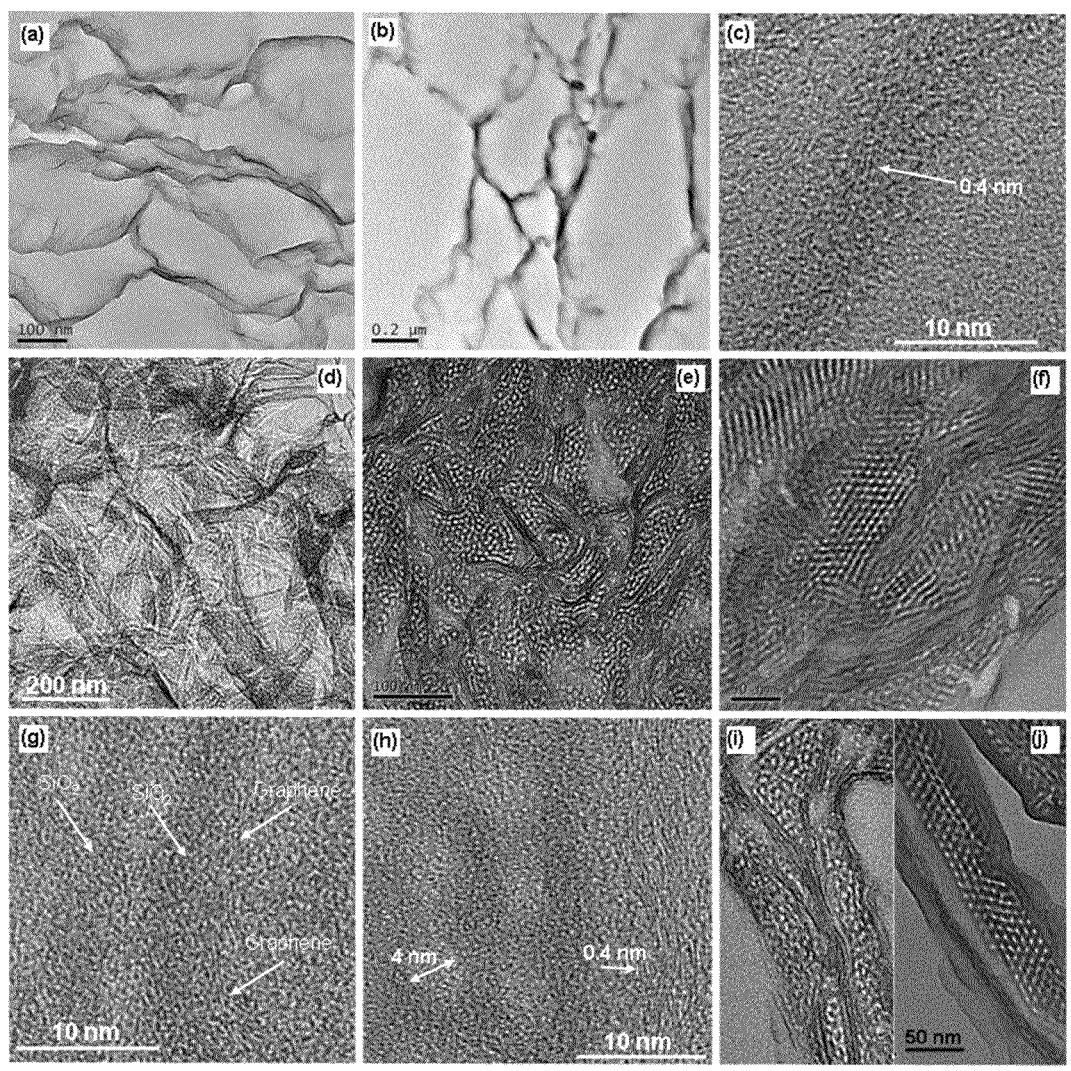
FIG. 1 *a-j* are a series of TEM images of FGS (functionalized graphene sheets) and FGS-MS (functionalized graphene sheet-mesoporous silica) nanocomposites. (a-b) FGS. (c) Cross-section TEM image of FGS. The arrow indicates a region of multilayer FGS on edge. (d) Low magnification plan view of the FGS-MS nanocomposite. (e) Cross-section TEM image of FGS-MS nanocomposite. (f) A high magnification cross-section image showing an ordered mesoporous domain on FGSs. (g-h) High resolution cross-section image near edge of FGS-MS. Arrows show mesoporous silica and graphene layers. (i-j) High magnification cross-section image of FGS-MS nanocomposite showing disordered (i) and ordered (j) mesoporous silica.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

A series of experiments were conducted to demonstrate several aspects of the present invention. One such aspect was the demonstration of a one-step, self-assembly approach to preparing functionalized graphene-mesoporous silica nanocomposites by coating the graphene sheets with a thin layer of mesoporous silica. Another aspect of the present invention was the investigation of the electrochemical applications of these new nanocomposite materials.

These experiments demonstrated that the combination of mesoporous silica and graphene has the potential to significantly improve electrochemical performance of devices using these nanocomposite materials. For example, but not meant to be limiting, these experiments further investigated the application of the nanocomposites for electrochemical double layer capacitors (supercapacitors). It was shown that coating the conductive graphene with a non-conducting silica material greatly enhanced the electrochemical energy storage capabilities. The specific capacitance of the nanocomposites was more than doubled as compared to that of pure graphene. The increased electrochemical energy storage is attributed to the modification of the graphene surface by mesoporous silica.

In addition to the use as supercapacitors, the nanocomposite materials of the present invention could also be used for other applications, for example, but not meant to be limiting, as high surface area supports for Pt catalysts in proton exchange membrane fuel cell (PEMFC) applications. Preliminary results of the experiments conducted to demonstrate the present invention suggest that the nanocomposite produces a much higher electrochemically active surface area (ESA) for the Pt particles as compared to both pure graphene and commercial materials, suggesting better dispersion of the catalyst on the composites.

Those having ordinary skill in the art and the benefit of this disclosure will thus recognize that the method and nanocomposite materials described herein can applied to other mesoporous materials as well as carbon materials beyond graphene for a variety of electrochemical applications.

Functional graphene sheets (FGSs), a highly conductive graphene from a rapid thermal expansion of graphite oxides, were used in these experiments. To prepare FGS-mesoporous silica (FGS-MS) nanocomposites, FGS was dispersed in a surfactant/silicate sol solution followed by vacuum filtration. The coating of mesoporous silica layer on FGSs is driven by evaporation induced self-assembly. By coating a thin layer of mesoporous silica on the graphene, the intrinsic high conductivity of graphene is maintained, while new function from the inorganic mesoporous silica is introduced.

0.125 g poly(ethylene oxide)-b-poly(propylene oxide)-b-poly(ethylene oxide) triblock copolymer (Pluronic P123, $EO_{20}PO_{70}EO_{20}$, Sigma-Aldrich, USA), 0.5 ml tetraethyl orthosilicate (TEOS, Sigma-Aldrich), and 0.4 g 0.1 M HCl were dissolved in 5 ml ethanol. The sol was stirred for 30 mins. 0.01 g FGS was added into the sol followed by vigorous stirring for 15 min. The mixture was dropwise added to a membrane filter under vacuum. The obtained black powders were dried overnight followed by calcination in static air at 400° C. for 2 h with a ramping rate of 1° C./min.

The electrochemical capacitor performance of FGS and FGS-MS were analyzed with a CHI 660c electrochemical workstation (DH Instruments Inc, Austin, Tex.). All experiments were carried out with a conventional three-electrode configuration in a beaker-type cell. To prepare the working electrode, 5 mg powder of FGS or FGS-MS powder was dispersed in 1 ml dimethyl formamide or 1 ml $H_2O$, respectively. The mixtures were sonicated for 5 minutes. 5 μA of the solution was deposited on glassy carbon electrode and dried in air. 5 μl of a 5% Nafion solution was dropped on the top of the electrode to prevent the loss of the composite material. A platinum wire and an Ag/AgCl electrode were used as the counter and reference electrodes, respectively. The electrolyte was 1M $Na_2SO_4$ aqueous solution. The specific capacitance was calculated from cyclic voltammograms according to C=I/(m×scan rate), where I represents average current in either positive or negative scan, and m is the mass of single electrode. It is well known that due to the series connection of two electrodes in real capacitors, the real capacitor would operate with a capacitance one-fourth that of the single electrode.

Typical transmission electron microscopy (TEM) images of FGS and FGS-MS nanocomposites are shown in FIG. 1. FIG. 1*a* shows that the free-standing 2D graphene sheets are not perfectly flat. They display intrinsic microscopic roughening and surface out-of-plane deformations (wrinkles). Interconnected pocket structures in the cross-sectional TEM image are shown in FIG. 1b, with the pocket sizes ranging from 100 to 200 nm. In these nanocomposites, mesoporous silica coating is observed throughout the sample. From high magnification scanning electron microscopy, it is shown that the graphene sheets form open stacked-card structures after the silica coating. No precipitates or separate silica particles are observed from the SEM images. However, TEM images in FIG. 1d to 1j clearly show silica mesostructures formed on the FGS surface after the surfactant was removed during calcination.

In FIG. 1d, the underlying graphene morphology is still clearly visible and similar to FIG. 1a, but a layer of worm like features covers the entire graphene surfaces. In most of the areas disordered worm-like structures are observed. Cross-sectional TEM images (FIG. 1e) show that the disordered mesoporous regions are divided into pockets (domains) by layers of graphene sheets. The pocket structure is similar to what is observed in pure graphene (FIG. 1b). Partially ordered mesostructures are only visible in some regions (FIG. 1f).

High resolution TEM images show the interfacial regions between the silica and graphene. FIG. 1g shows a very thin layer of graphene sheets. The curved graphene sheets are covered by mesoporous silica layers closely follow the contours of the graphene sheets. The pore channels separating the silica can be also observed. FIG. 1h shows another high resolution image in which both the graphene layers and the nanoporous silica channels can be observed. Like the pure graphene materials, stacked graphene sheets are still observed in the nanocomposites. In high-magnification cross-sectional images shown in FIG. 1h, each layer may not represent a single graphene sheet. In cross-sectional TEM, both the underlying graphene and the mesopore structures can be clearly identified near the edge of FGSs. 4 to 7 layers of porous micellar mesostructures (about 40 nm in thickness) indicated by arrows can be observed in mesoporous silica layers on FGS.

The nitrogen adsorption isotherm further confirmed the existence of mesoporous structure in FGS-MS nanocomposites. Pore size distributions determined using the Barrett-Joyner-Halenda (BJH) model indicate a narrow mesopore of 4 to 5 nm in diameter. This pore size is slightly smaller than the bulk mesoporous materials using the same surfactant due to the shrinkage of planar coating.

To investigate the effects of coating thickness, solutions with various concentrations of surfactant and TEOS were used to obtain FGS-MS nanocomposites with different coating morphology. Two control samples, FGS-MS-1 and FGS-MS-2, were denoted to the one prepared with surfactant and TEOS concentration 10 times diluted or 5 times higher than typical FGS-MS nanocomposites, respectively as shown in Table 1.

TABLE 1

Synthesis condition of FGS-MS nanocomposite.

|  | P123 (g) | TEOS (ml) | 0.1M HCl (g) | Ethanol (ml) | FGS (g) | Content of silica (wt %) |
|---|---|---|---|---|---|---|
| FGS-MS | 0.125 | 0.5 | 0.4 | 5 | 0.01 | 29.08 |
| FGS-MS-1 | 0.0125 | 0.05 | 0.4 | 5 | 0.01 | 19.06 |
| FGS-MS-2 | 0.625 | 2.5 | 0.4 | 5 | 0.01 | 80.16 |

With a high surfactant and silica concentration, partially ordered mesoporous structures were observed in large areas in FGS-MS-2 (FIG. 1f). When a much diluted silica sol was used in the preparation of FGS-MS-1, the mesostructures could be barely observed, but composition analysis clearly reveals the existence of the silica coating.

Figure 2:
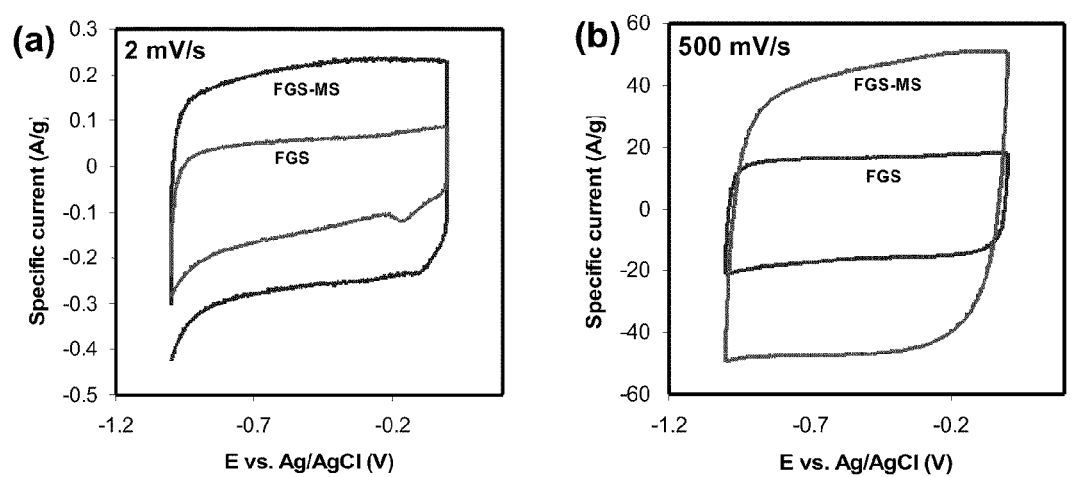
FIG. 2 shows cyclic voltammograms (CV) of FGS and FGS-MS measured in 1M $Na_2SO_4$ aqueous solution at various scan rates through a potential range of (−1)-0V with saturated Ag/AgCl as the reference electrode. a) CV of FGS and FGS-MS with scan rate of 2 mV/s, (b) CV of FGS and FGS-MS with scan rate of 500 mV/s.

The FGS-MS nanocomposites, combining high conductivity of graphene and hydrophilic surface of mesoporous silica, are evaluated as electrodes for electrochemical charge storage in capacitors and compared with FGS. The cyclic voltammograms (CV) of FGSs and FGS-MS nanocomposites recorded at a various scan rates in 1M $Na_2SO_4$ solutions are shown in FIG. 2. Both FGS and FGS-MS nanocomposites display a capacitive charging current at both scanning directions across the potential range −1.0 to 0 V (vs. saturated Ag/AgCl reference electrode). CVs of FGS keep ideal rectangular shape at high potential scan rate of 500 mV/s (FIG. 2b). A small redox current peak near −0.2V is observed, which comes from reactions of electroactive surface functional groups of graphene (e.g., —C—OH, —C═O and —COOH). The single electrode capacitance of FGS, calculated by integrating half of the CV square shapes, is 56 F/g and 39 F/g at scant rate of 2 mV/s and 500 mV/s, respectively.

The capacitance under the slow scan rate is similar to what is obtained for graphene using two electrode configuration and full cycle integration, which caused a factor of two differences. Normalized against the surface area (600 $m^2$/g) for the graphene used, a specific capacitance of 10 $\mu F/cm^2$ is obtained, in good agreement with other carbon materials.

The CV of FGS-MS nanocomposites also show ideal rectangularity at both low and high scan rates (FIGS. 2a and 2b), but the CV windows of FGS-MS are much larger than that of FGS, resulting in a much higher capacitance. Cyclic voltammograms clearly show that the coating of mesoporous silica doesn't sacrifice the electrochemical capacitance of graphene but greatly improves its performance. The capacitance of FGS-MS more than doubled to 120 F/g and 95 F/g at scan rate of 2 mV/s and 500 mV/s, respectively. It should be noted that this particular sample contains roughly 30 wt % non-conducting silica measured from thermogravimetric analysis (TGA).

In principle, the silica should not be expected to contribute to the total capacitance. The specific capacitance includes the "dead weight" of the silica phase. If the weight of the silica were not included in the calculation, the specific capacitance of graphene in the nanocomposites should be even higher, 171 F/g and 136 F/g (of graphene) at scan rate of 2 mV/s and 500 mV/s, respectively. The specific capacitance then corresponds to 28 $\mu F/cm^2$, which is high for carbon materials.

Figure 3:
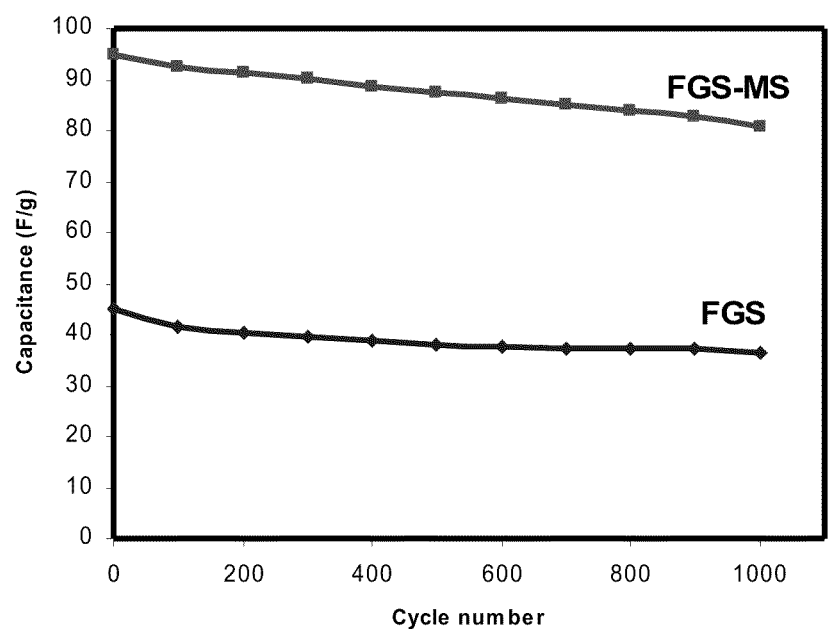
FIG. 3 is a graph showing the cycling performance of FGS and FGS-MS. The scan rate is 100 mV/s between (−1) to 0V in a 1M $Na_2SO_4$ electrolyte.

The cycling performance of FGS and FGS-MS are presented in FIG. 3. Both FGS and FGS-MS show good stability for at least 1000 cycles with capacitance loss within 15%. The gradual decrease in capacitance may result from pseudocapacitance contributed from redox reactions of surface functional groups of graphene, similar to previous observation in functionalized carbon nanotubes.

Figure 4:
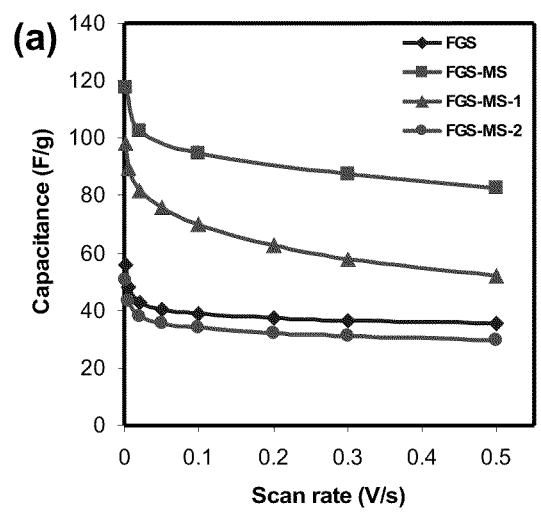
FIG. 4 is a graph showing a comparison of the specific capacitances for FGS and all FGS-MS nanocomposites. (a) The specific capacitance at different scan rates in a potential range of (−1)-0 V.

FIG. 4 summarizes the capacitance of FGS and all FGS-MS samples at different scan rates. As shown in FIG. 4a, capacitances slightly decrease with increasing scan rate in all samples. With addition of a mesoporous silica coating, the capacitance of FGS-MS nanocomposites significantly increases and doubles the capacitance of pure FGS over the entire scan rate range. It should be noted that much higher silica content in FGS-MS-2 causes the capacitance to decrease to below the level for pure FGS, which may be attributed to decreased conductivity and the increase of dead weight with excessive silica coating. Another important observation is that the enhancement in electrochemical capacitance depends on the bias. Although FGS-MS nanocomposites have a much higher specific capacitance under both positive (0 to 1V) and negative bias (−1 to 0V), the results under negative bias are much more obvious (scan rate of 100 mV/s). Under negative bias, FGS-MS and FGS-MS-1 exhibit 2.4 times and 1.8 times enhancement over FGS respectively, but under positive bias, FGS-MS and FGS-MS-1 only exhibit 1.9 times and 1.2 times enhancement.

The above discussion confirms that the mesoporous silica coating amplifies the electrochemical response of the carbonaceous material. Furthermore, from all the CV curves, the open circuit potential remains the same, suggesting that there is no additional redox reaction in the nanocomposite. Traditionally redox materials are applied to carbon to increase the capacitance. There has been no study on using "inert, non-conductive" silica as the coating materials. There might be several reasons for the observed enhanced capacitance. First, since the graphene is hydrophobic and the preparation of the nanocomposite involves the use of a surfactant and hydrophilic silica, it is possible the graphene materials become more dispersed and the mesoporous silica prevents the graphene sheets from restacking due to van der Waals forces. Although the overall microstructural characterization by TEM and SEM does not reveal significant changes, the specific surface area measured by nitrogen absorption (BET method) is indeed increased from 600 $m^2/g$ to 800 $m^2/g$. Since it is well known the mesoporous silica prepared using the current method has an approximate surface area of 450 $m^2/g$, the increase of the surface area can be only attributed to better separation of the graphene sheets. However, this surface area increase of approximately 30% is not sufficient to explain the more than 100% increase in the specific capacitance. Therefore, surface chemistry in addition to surface area, must play an important role.

The hydrophilic mesoporous silica with continuous pore channels could improve wetting and diffusion. Generally, higher surface area of carbon leads to higher ability for charge accumulation, and thus the higher specific capacitance. However, specific capacitances obtained from carbon materials are usually much lower than expected. One main cause of the lower capacitance than expected is poor wettability of the electrode material in electrolyte solution, which results in a less accessible surface area for the formation of electrochemical double layers.

In the case of FGSs, the surface of FGSs is relatively hydrophobic after high temperature process during thermal expansion, resulting in poor wettability. In principle, the specific capacitance of graphene can be significantly increased if much of the intrinsic surfaces can be accessed. After functionalization with mesoporous silica, the FGS-MS nanocomposites became hydrophilic. A comparison of FTIR spectra of bare FGS and FGS-MS showed the presence of surface hydroxyl groups in FGS-MS. In addition, the mesoporous silica contains a continuous network of uniform, nanometer-size channels. The improved wetting and the nanoporous channels should have a positive effect on improving the accessibility of the electrolyte to the electrode surfaces, therefore increasing the specific capacitance.

Another factor to consider is whether the electrochemical double layer of silica itself contributed to the total capacitance. Silica is able to develop a very high negative surface charge and has one of the highest electrical double layer potential and capacitance (over 60 $\mu F/cm^2$). If the interpenetrating network of graphene and silica is viewed as an equivalent circuit of two capacitors, the contribution from silica can be estimated based on the area specific capacitance (60 $\mu F/cm^2$), the weight percentage (30 wt % for example) and the specific surface (about 450 $m^2/g$ for evaporation driven self-assembly). The contribution from silica becomes 80 F for 0.3 g silica. The contribution from graphene is 40 F for 0.7 g graphene. Then the total specific capacitance is 120 F/g for the 30 wt % silica sample (FGS-MS), which is almost the same as the experimental results. A similar calculation for the 20 wt % silica sample (FGS-MS-1) can be performed, which gives an estimated specific capacitance of 100 F/g, again in excellent agreement with the experimental result.

These calculations suggest that the increased capacitance is likely derived from the double layer capacitance of silica. From the TEM images, the total silica coatings thickness are approximately 40 nm, and each individual layer in the high resolution TEM images is only a few nanometers.

FGS-MS nanocomposites can also be used as a novel electrode support for electrochemical catalysis. In Polymer Electrolyte Membrane fuel cells (PEMFCs), the electrooxidation of hydrogen or methanol directly converts chemical energy into electricity. PEMFCs are attractive for transportation vehicles and small-scale static power supplies because of their high theoretical efficiency. A typical hydrogen or methanol fuel cell consists of an anode and a cathode that are separated by the electrolyte. The anodic oxidation reactions in hydrogen and methanol fuel cells produce protons and electrons. The cathodic reactions in both types of fuel cells involve the reduction of $O_2$ to produce $OH^-$, which combines with $H^+$ to produce water to complete the overall electrochemical reactions. Currently the leading cathode electrocatalysts are carbon supported platinum (Pt) and Pt-based alloys. Despite its enormous potential, the PEMFC technology is not widely used at present, partially due to the cost of the Pt containing cathodes. Therefore one of the major challenges in the commercialization of fuel cells is to substantially reduce the metal loading of the Pt electrocatalysts. One approach to accomplish this goal to develop better cathode supports for improved dispersion and adhesion of the Pt catalysts. In the literature, aero-gel silica-carbon was investigated to support Pt and it was found that the addition of aero-gel silica significantly increased the activity of the catalyst.

The main advantage of graphene is its high surface area, good crystallinity and good conductivity, but its performance as a cathode material for Pt catalyst has not been investigated. In this study, Pt nanoparticles are loaded onto FGS and FGS-MS nanocomposites (denoted to Pt-FGS and Pt-FGS-MS, respectively) via impregnation methods to investigate its electrochemical surface area (ESA), which is an indication of the dispersion and the activity of the metal catalyst particles. The ESA value is determined by the particle sizes and the accessible surfaces. A higher ESA value suggests a smaller particle size, and higher catalytic activity.

Figure 5:
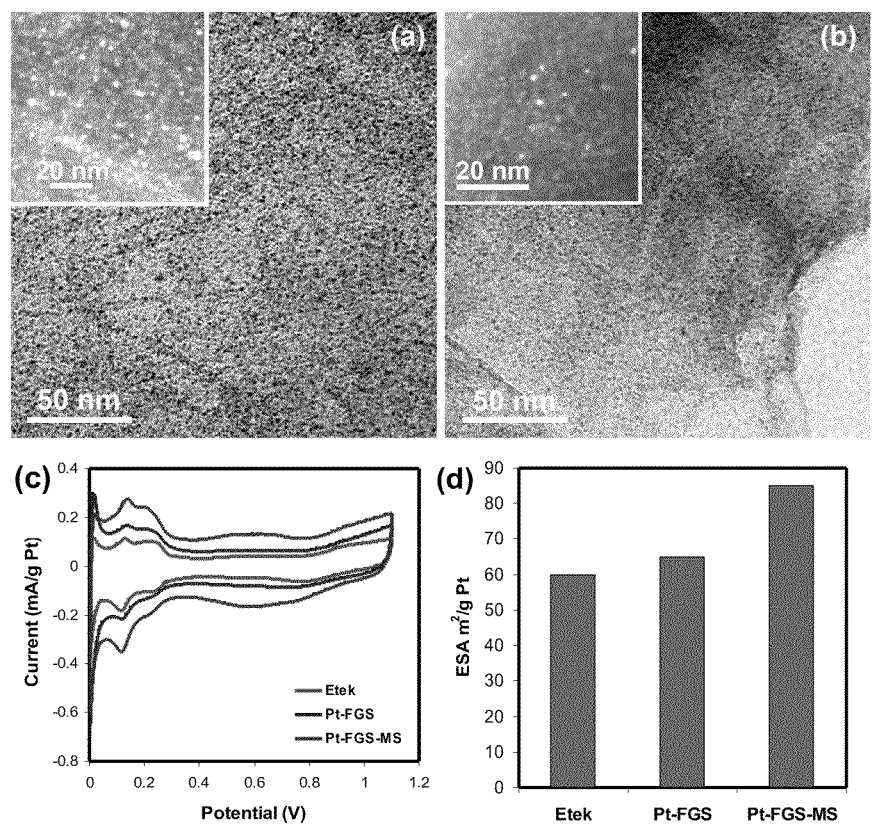
FIG. 5 *a* through *d* are TEM and electrochemical characterization of Pt-FGS (platinum-functionalized graphene sheet) and Pt-FGS-MS (platinum-functionalized graphene sheet-mesoporous silica) nanocomposites. (a) TEM image of Pt-FGS. (b) TEM image of Pt-FGS-MS. Corresponding insets show dark-field TEM images in a and b.

FIGS. 5a and 5b show TEM images of as-prepared Pt-FGS and Pt-FGS-MS, respectively. TEM images show uniform, even distribution of Pt nanoparticles on FGS and FGS-MS substrates. Dark-field TEM images in insets show crystalline Pt nanoparticles on FGS and FGS-MS. The average size of the Pt nanoparticles on Pt-FGS is around 2.0 nm which is larger than that (1.6 nm) on FGS-MS. Pt nanoparticle size on both Pt-FGS and Pt-FGS-MS is much smaller than that of commercial electrocatalyst Etek, which is still one of the best cathode materials for PEMFCs with Pt supported on high surface area carbon. FGS has a surface area of 600 $m^2/g$ and after coating with silica, FGS-MS still possess surface areas as high as 800 $m^2/g$ which is much higher than that of commercial Etek (250 $m^2/g$). Cyclic voltammograms (FIG. 5c) in 0.5M $H_2SO_4$ show standard hydrogen adsorption behavior with potential at 0.12 and 0.23 V. Consistent with above mentioned capacitor study, Pt-FGS-MS also shows much higher capacitance charge storage than Pt-FGS in the potential range in $H_2SO_4$ solution. The ESA is estimated from the peak area in the CV curve from 0.12 to 0.23 V. The Etek has an electrochemically active surface area (ESA) of 60 m²/g in our test. For graphene, the ESA value increases to 65 m²/g (Pt-FGS) and Pt-FGS-MS is 85 m²/g as shown in FIG. 5d. Both graphene-containing samples show higher ESA than that of the commercial Etek. For a given quantity of Pt, the smaller the metal nanoparticle size, the higher the electrochemically active surface area. The higher ESA of Pt obtained from FGS and FGS-MS may be attributed to the smaller Pt nanoparticles deposited.

One difference between graphene and Etek is that the former has a much higher surface area, which might have contributed to a higher ESA for native graphene. The mesoporous silica coating on graphene further increased the active surface area. The silica surface maybe helpful in improving the wetting and the adhesion between the metal particles and the carbon surfaces, which is a significant problem in PEMFCs.

In summary, these experiments demonstrated a novel and effective method to functionalize a graphene surface by coating graphene sheets with a thin layer of mesoporous silica in a one step self-assembly process. These nanocomposite materials showed surprising improvement in electrochemical energy storage capabilities as compared to pure graphene. The specific capacitance increases from about 55 F/g of bare graphene to more than 120 F/g of the nanocomposites. Pt nanoparticles loaded on the functionalized graphene-mesoporous silica nanocomposites also showed much higher electrochemical surface area than that of pure graphene sheets. This disclosure thus provides those having ordinary skill in the art the ability to functionalize and process not only graphene, but also other materials for electrochemical applications. Those having ordinary skill and the benefit of this disclosure will readily recognize that with the rich silane chemistry, various functional groups can be grafted on the mesoporous silica layer. In this manner, many other applications, including but not limited to sensors, nanocomposites, membranes and catalysts supports, are thereby enabled by this disclosure.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

We claim:

1. An energy storage device comprising a nanocomposite material having a plurality of layers each layer of the plurality of layers comprising a graphene layer and a mesoporous metal oxide layer having pores with diameters ranging from about 1 nm to about 30 nm, the metal oxide layer bonded directly to at least one of the graphene layer, the plurality of layers of the nanocomposite material thereby forming an ordered stacked-layers structure.

2. The energy storage device of claim 1 wherein said mesoporous metal oxide is silica.

3. The energy storage device of claim 1 wherein the graphene layers and the mesoporous metal oxide layers are generally uniformly distributed throughout said nanocomposite material.

4. The energy storage device of claim 1, wherein the energy storage device is an ultracapacitor.

5. The energy storage device of claim 1 wherein the energy storage device has a specific capacitance and the specific capacitance of the energy storage device is at least twice the specific capacitance of an energy storage device formed of the graphene layer without mesoporous metal oxide layers.

6. The energy storage device of claim 4, the ultracapacitor is a double layer ultracapacitor.

7. The energy storage device of claim 4, wherein the capacitance of the ultracapacitor is greater than 150 F/g.

8. The energy storage device of claim 4, wherein the capacitance of the ultracapacitor is greater than 200 F/g.

9. An ultracapacitor comprising a nanocomposite material having a plurality of layers, each layer comprising a mesoporous silica material having pores with diameters ranging from about 1 nm to about 30 nm, the silica material forming a silica layer bonded directly to a graphene layer, the plurality of layers forming the nanocomposite material thereby forming a stacked-layer structure alternating the silica layer and the graphene layer, wherein a capacitance of the ultracapacitor is greater than 150 F/g.

10. The ultracapacitor of claim 9 wherein the ultracapacitor has a specific capacitance and the specific capacitance of the ultracapacitor is at least twice the specific capacitance of the same ultracapacitor formed of graphene layers without mesoporous silica layers.

11. The energy storage device of claim 10, wherein the capacitance of the ultracapacitor is greater than 200 F/g.

12. An energy storage device comprising:
a nanocomposite material including a plurality of layers with the layers comprising a metal oxide layer and a graphene layer, the metal oxide layer formed of a mesoporous metal oxide material having mesopores therein, each metal oxide layer bonded directly to at least one of the graphene layer wherein individual graphene layers have thicknesses not greater than 10 nms, the graphene layers and the mesoporous metal oxide layers alternating in the nanocomposite material thereby forming a stacked-layers structure.

13. The energy storage device of claim 12 wherein the mesoporous metal oxide material is silica.

14. The energy storage device of claim 12 wherein each graphene layer and each mesoporous metal oxide layer are substantially uniformly distributed throughout the nanocomposite material.

15. The energy storage device of claim 12, wherein the energy storage device is an ultracapacitor.

16. The energy storage device of claim 12, wherein a capacitance of the ultracapacitor is greater than 150 F/g.

17. An energy storage device comprising a nanocomposite material having a plurality of layers, each layer of the plurality of layers comprising a graphene layer and a silica material layer, wherein the silica material has pores therein such that the silica material is mesoporous, the silica material layer bonded directly to at least one of the graphene layer, the plurality of layers of the nanocomposite material thereby forming a stacked-layers structure.

18. The energy storage device of claim 17, wherein the energy storage device is an ultracapacitor having a capacitance greater than 150 F/g.

* * * * *